United States Patent
Rokunohe et al.

(10) Patent No.: US 6,759,616 B2
(45) Date of Patent: Jul. 6, 2004

(54) GAS INSULATED SWITCHGEAR

(75) Inventors: Toshiaki Rokunohe, Hitachinaka (JP); Fumihiro Endo, Hitachi (JP); Kenji Tsuchiya, Hitachi (JP); Toyokazu Tanaka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/688,989

(22) Filed: Oct. 21, 2003

(65) Prior Publication Data
US 2004/0079731 A1 Apr. 29, 2004

Related U.S. Application Data

(62) Division of application No. 09/950,672, filed on Sep. 13, 2001, now Pat. No. 6,680,453.

(30) Foreign Application Priority Data

Feb. 7, 2001 (JP) .......................................... 2001-31118

(51) Int. Cl.[7] .............................................. H01H 9/40
(52) U.S. Cl. .................................. 218/2; 218/7; 218/79
(58) Field of Search .............................. 218/2, 5, 7, 12, 218/118, 122, 79, 80, 134, 139, 155; 361/600–618

(56) References Cited

U.S. PATENT DOCUMENTS

| 4,241,379 A | | 12/1980 | Olsen |
| 5,625,530 A | * | 4/1997 | Inami et al. ................. 361/604 |
| 5,796,060 A | | 8/1998 | Fuchsle et al. |
| 6,121,566 A | | 9/2000 | Biquez et al. |
| 6,469,270 B1 | * | 10/2002 | Omori et al. ................... 218/7 |

FOREIGN PATENT DOCUMENTS

| JP | 8-275323 | 10/1996 |

* cited by examiner

Primary Examiner—Elvin Enad
Assistant Examiner—M. Fishman
(74) Attorney, Agent, or Firm—Mattingly, Stanger & Malur, P.C.

(57) ABSTRACT

A gas insulated switchgear capable of performing maintenance and inspection of a breaker without shutting down a bus line includes a first case containing a breaker and having a bushing for leading a load and a second case containing a plurality of disconnectors and having a plurality of bushings for leading a plurality of bus lines to be connected to the disconnectors. The first case and the second case are connected to each other through a gas partition spacer.

3 Claims, 11 Drawing Sheets

GAS INSULATED SWITCHGEAR

This is a divisional application of U.S. Ser. No. 09/950,672, filed Sep. 13, 2001 now U.S. Pat. No. 6,680,453.

BACKGROUND OF THE INVENTION

The present invention relates to a gas insulated switchgear, and particularly, a gas insulated switchgear containing a breaker and a disconnector.

Gas insulated switchgears composing a breaker, a disconnector, an earthing switch and so on inside a metallic case filled with an insulation gas are widely used. For example, Japanese Patent Application Laid-Open No.8-275323 discloses a gas insulated switchgear containing equipments such as a breaker, a disconnector, an earthing switch and so on inside a grounded metallic case filled with $SF_6$ gas having an excellent insulating property and an excellent arc extinguishing property. Since the gas insulated switchgear contains the equipments inside the grounded metallic case filled with $SF_6$ gas having an excellent insulating property and an excellent arc extinguishing property, as described above, the gas insulated switchgear can improve the hostile-environment property, downsize the equipment or reduce the installation area per capacity.

SUMMARY OF THE INVENTION

The conventional gas insulated switchgear described above is generally constructed by containing the equipments such as the breaker, the disconnector, the earthing switch and so on inside one metallic case, as disclosed in Japanese Patent Application Laid-Open No.8-275323. Therefore, when the breaking portion of the breaker is opened to atmospheric air at inspection of the breaker, the other switches contained in the same metallic case are also opened to atmospheric air. Accordingly, at maintenance and inspection of the breaker, it is necessary to shut down the bus line during that period.

The present invention is made in order to solve the above-mentioned problem, and an object of the present invention is to make the whole switchgear compact and to provide a gas insulated switchgear which can perform maintenance and inspection of the breaker without shutting down the bus line.

The present invention employs the following means in order to solve the problems described above.

A gas insulated switchgear comprises a first metallic case containing a breaker; bushings for leading a load; a second metallic case containing a plurality of bus line disconnectors; and a plurality of bushings for leading a bus line to be connected to the bus line disconnectors, and the first metallic case and the second metallic case are connected to each other through a gas partition spacer. Further, the plurality of bushings for leading a bus line are attached to the second metallic case with a preset spreading angle between the adjacent bushings for leading a bus line.

DESCRIPTION OF PREFERRED EMBODIMENTS OF THE INVENTION

Figure 1:
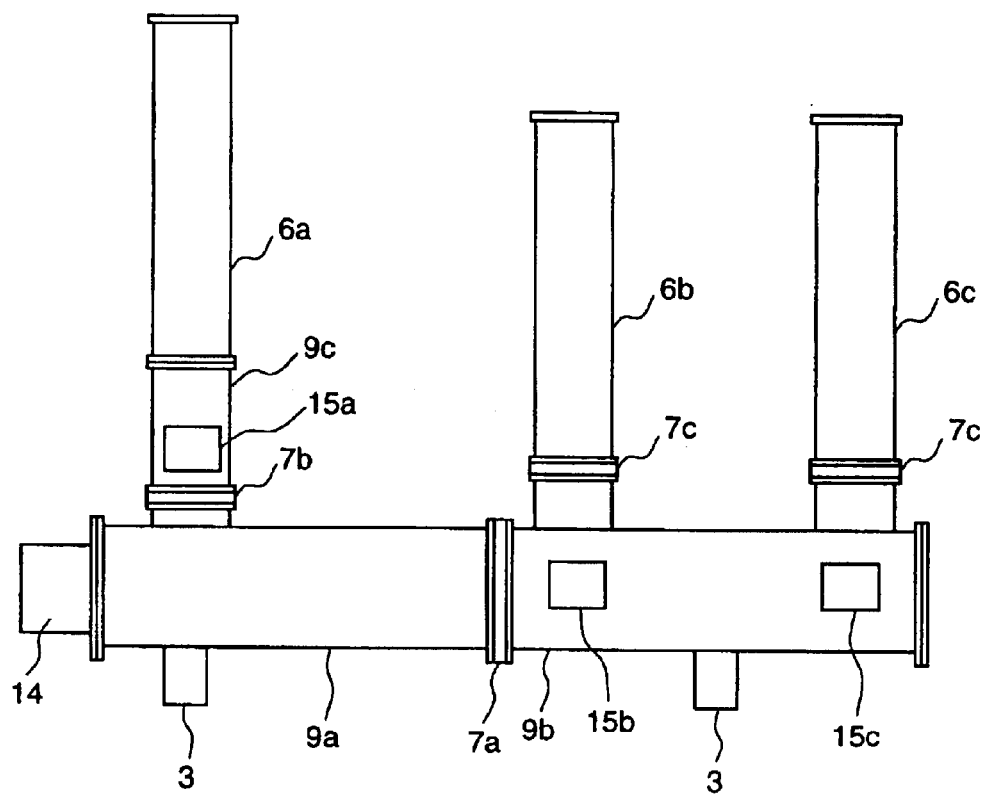
FIG. 1 is a view showing a first embodiment of a gas insulated switchgear in accordance with the present invention.

Embodiments of the present invention will be described below, referring to the accompanied drawings. FIG. 1 is a view showing a first embodiment of a gas insulated switchgear in accordance with the present invention. The figure shows an example that a horizontal breaker is applied to a double bus line circuit. A bushing 6a for leading a load is attached to a grounded metallic case 9a containing a breaker through a metallic case 9c containing a breaker in the load side. On the other hand, a bushings 6b and 6c for leading a bus line are attached to a grounded metallic case 9b containing bus line disconnectors. Further, the metallic cases 9a and 9b are coupled with each other through a gas partition spacer 7a. The reference character 3 is an earthing switch inserted between an internal conductor and the ground, the reference character 14 is a breaker operating unit attached to one end of the metallic case 9a, and the reference characters 15a, 15b, 15c are operating units of disconnectors contained in he metallic cases 9c and 9b, respectively.

The disconnector in the load side is contained in the grounded metallic case 9c, and gas-partitioned from the metallic case 9a by a gas partition spacer 7b. Further, the bushings 6b and 6c for leading a bus line are gas-partitioned from the metallic case 9b by a gas partition spacer 7c. Since each of the bushings 6a, 6b, 6c is arranged nearly perpendicularly to a center axis of the grounded metallic case, a load acting onto each bushing attaching portion can be made small, and the workability at assembling can be improved. Furthermore, the length of the grounded metallic cases 9a, 9b can be shortened down to a length determined by required air insulation distances between the bushings 6a, 6b, 6c.

In the present embodiment of the gas insulated switchgear, since the components necessary for the high voltage switching unit such as the breaker, the disconnector and the earthing switch are individually contained in the gas partitioned metallic cases, it is possible to provide the gas insulation which is compact and capable of performing maintenance and inspection of the breaker without shutting down the bus line.

Figure 2:
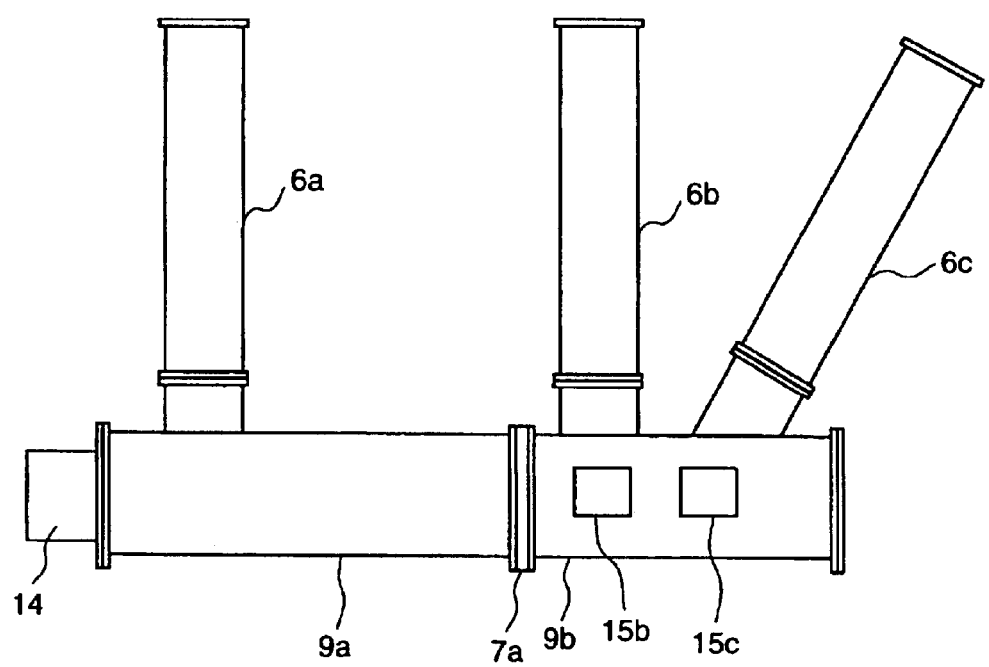
FIG. 2 is a view showing a second embodiment of a gas insulated switchgear in accordance with the present invention.

FIG. 2 is a view showing a second embodiment of a gas insulated switchgear in accordance with the present invention. The figure shows an example that a horizontal breaker is applied to a double bus line circuit. In the figures, thereinafter, the same parts as the parts shown in FIG. 1 are identified by the same reference characters, and the explanations is to be omitted.

Points different from the first embodiment are that the bushing 6c for leading a bus line is attached to the grounded metallic case 9b in slanting with respect to the center axis of the grounded metallic case 9b, and that the disconnector in the load side is eliminated. By eliminating the disconnector in the load side, the height of the bushing 6a can be lowered. By doing so, the heights of all the bushing 6a, 6b, 6c are made even. In addition, by attaching the bushing 6c in slanting outward, the length of the grounded metallic case 9b containing the bus line disconnectors can be shortened, and accordingly the whole switchgear can be made compact.

Figure 3:
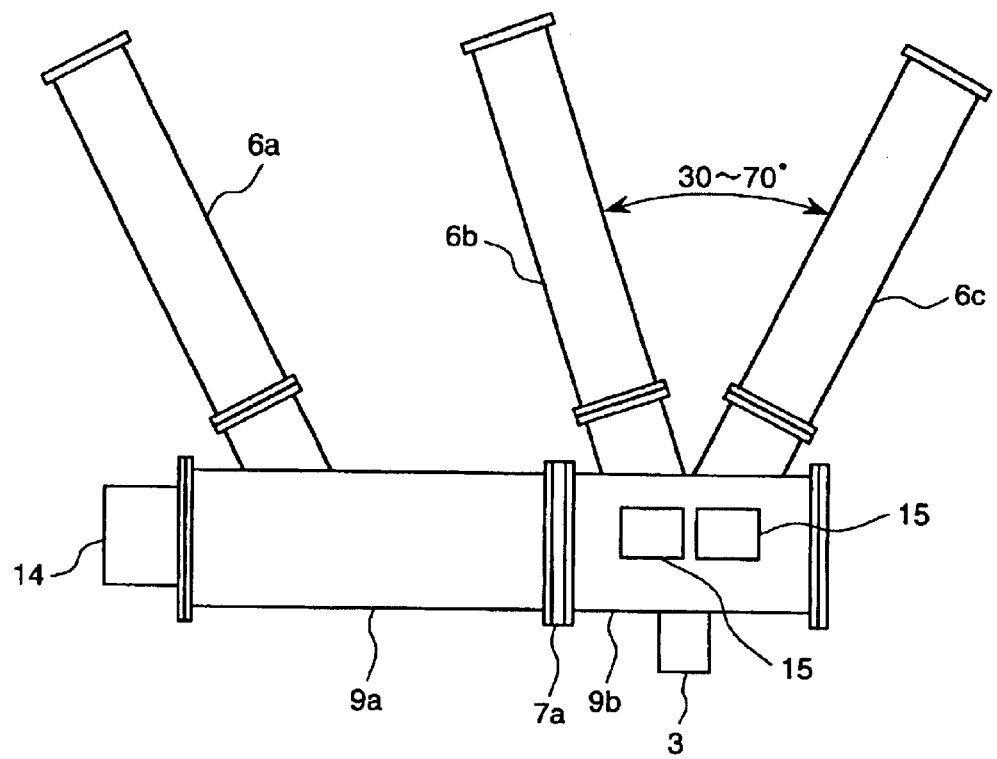
FIG. 3 is a front view showing a third embodiment of a gas insulated switchgear in accordance with the present invention.
Figure 4:
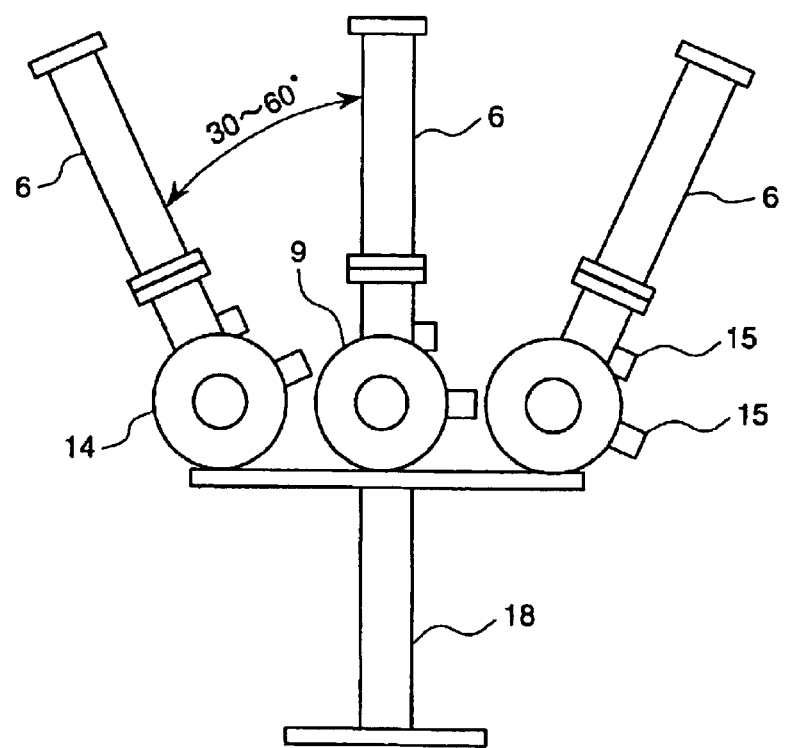
FIG. 4 is a side view showing the third embodiment of a gas insulated switchgear in accordance with the present invention.

FIG. 3 and FIG. 4 are a front view and a side view showing a third embodiment of a gas insulated switchgear in accordance with the present invention. The figures show an example that a horizontal breaker is applied to a double bus line circuit. As shown in the figures, the gas insulated switchgear comprises the grounded nearly cylindrical metallic cases 9a, 9b filled with an insulation gas, for example, $SF_6$ gas or the like. Three units for three phases of the metallic cases 9a, 9b are supported together by a single base structure 18. In order to shorten the total length of the metallic cases 9a, 9b, all the bushings are attached in slanting with respect to the axis of the metallic cases 9a, 9b placed neatly horizontally. For example, when the spreading angle between the bushings 6b and 6c for leading a bus line is designed to be an angle within a range of 30 degrees to 70 degrees, it is easy to balance the height and the length of the gas insulated switchgear.

Further, as shown in the side view of FIG. 4, by slanting the attaching angle of the bushings by an angle within a range of 30 to 60 degrees with respect to the vertical plane passing though the center axis of the metallic case, the interphase distance of the metallic cases 9 can be decreased while the interphase insulation distance of the top end portions of the bushings 6 is being kept.

By attaching the bushings in a slanting state as described above, the switchgear can be made further compact. From the view points of withstanding voltage performance in a contaminated condition and of seismic performance, it is preferable to use a duplex insulator tube formed of a skeletal structure made of FRP coated with a silicone group rubber as the bushing. The weight of the switchgear can be made very light by using the duplex tube compared to that when a ceramic bushing is used. Therefore, a small crane can be used as a crane necessary for installing the switchgear, and the foundation for installing the switchgear can be simplified. Furthermore, the compact switchgear has an effect to reduce cost of the installation working and cost of the foundation work.

Figure 5:
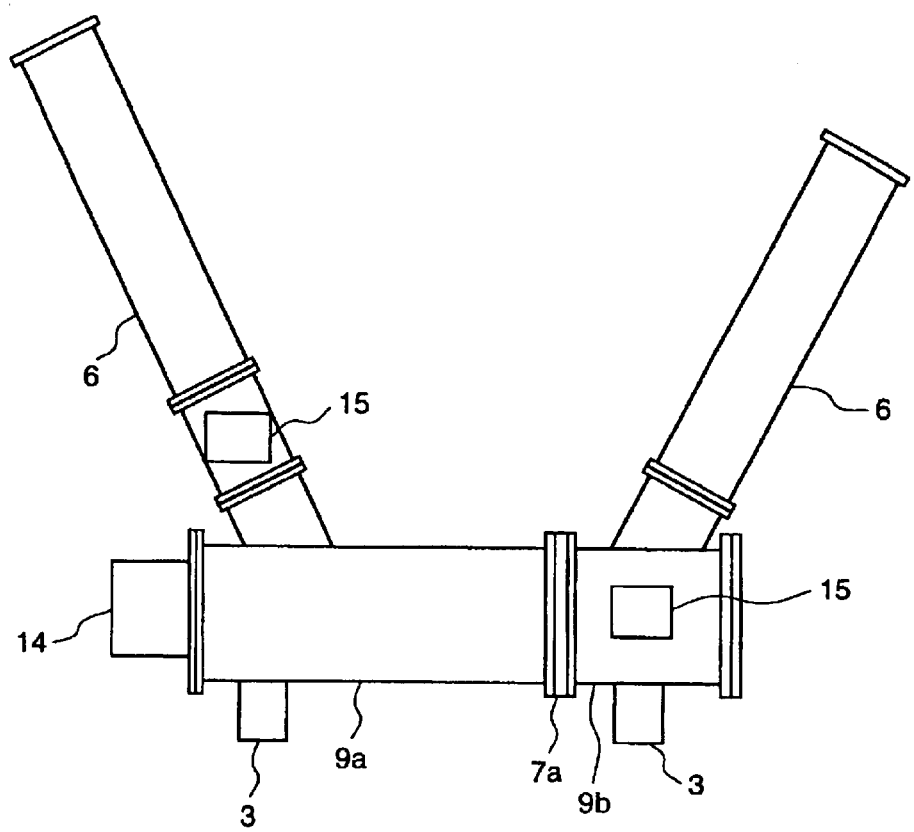
FIG. 5 is a view explaining a fourth embodiment.
Figure 6:
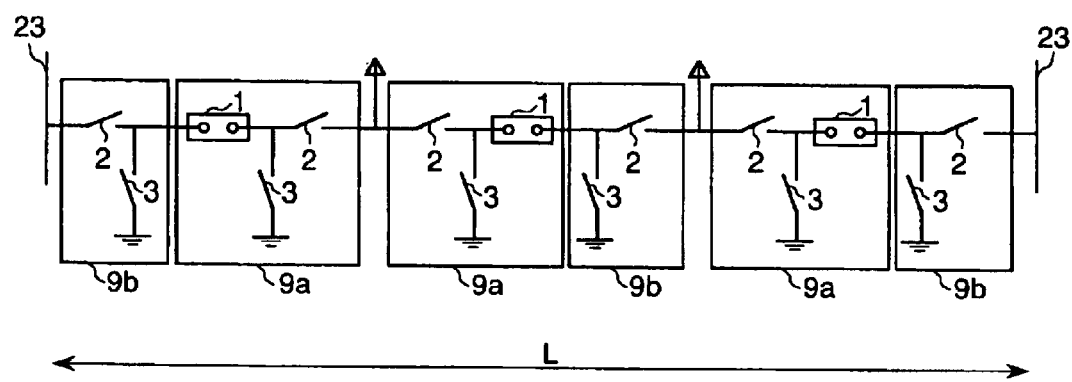
FIG. 6 is a view explaining the fourth embodiment.

FIG. 5 and FIG. 6 are a view explaining a fourth embodiment of the present invention. FIG. 5 is the view showing a gas insulated switchgear applicable to a bus line of a single bus system, and FIG. 6 is a single line wiring diagram of a bus line of 1-½ breaking system which the switchgear is applied to.

The gas insulated switchgear in accordance with the present embodiment comprises a metallic case 9a containing a breaker 1, a disconnector 2 and an earthing switch 3; and a metallic case 9b containing a disconnector 2 and an earthing switch 3.

If a 3-position disconnector is employed for the disconnector near the breaker in the double bus line system, it is possible by eliminating only the bus line bushing and the bus line disconnector in the end portion to cope with application of the gas insulated switchgear to a 1-½ bus line. Further, the switchgear can be made small by replacing the metallic case 9b with a small metallic case 9b containing two bus line disconnectors 2a, 2b to be described later. Further, as shown in FIG. 6, when the gas insulated switchgear is applied to the bus line of a 1-½ breaking system, the length of a yard for a transformer station or a switchgear station can be shortened. Therefore, there is also an effect in that the area of the yard for a transformer station or a switchgear station can be decreased.

Figure 7:
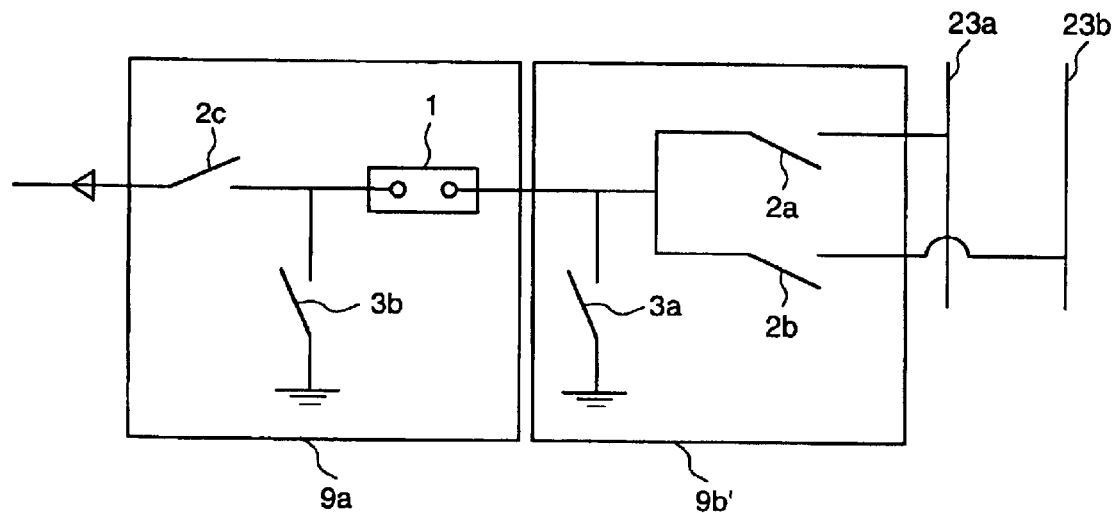
FIG. 7 is a view explaining a fifth embodiment.

FIG. 7 is a view explaining a fifth embodiment of the present invention and shows a gas insulated switchgear which is capable of applying to a bus line of a double bus system.

As shown in the figure, earthing switches 3a, 3b are arranged in the both sides of a breaker 1. Further, an earthing switch 3a and a bus line disconnectors 2a, 2b in the side of bus lines 23a, 23b are contained in one metallic case 9b', and the breaker 1, the switch 2c and the earthing switch 3b described above are contained in another metallic case 9a. By constructing as described above, even if the aforementioned metallic case 9a is removed, voltage of an exposed conductor can be certainly grounded by the earthing switch 3a. Therefore, the safety at replacing a cassette of the breaker 1 can be improved.

Further, since use of an insulation gas having a low arc distinguishing performance hardly decreases the performance of the disconnector, it is possible to change a kind, a mixing ratio or a gas pressure of an insulation gas to be filled in the metallic case containing the breaker and the bus line disconnectors. For example, mixed gases of $N_2$ gas and $SF_6$ gas are used as the insulation gas for the breaker and for the disconnector. A content of $SF_6$ gas in the mixed gas for the bus line disconnector can be reduced. In addition, a gas pressure of the mixed gas used for the bus line disconnector can be lowered. By doing so, a using amount of $SF_6$ gas of a global warming gas can be reduced.

Figure 8:
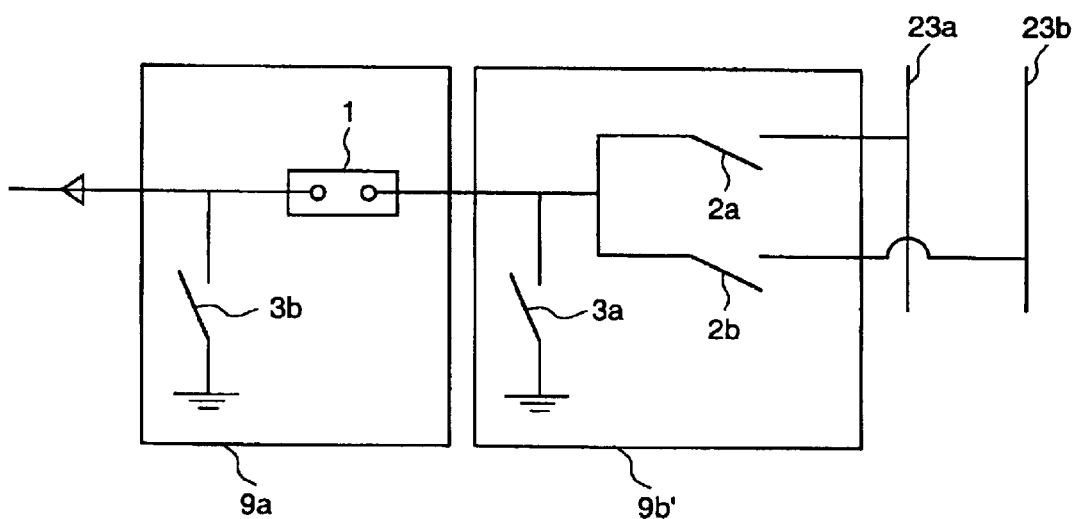
FIG. 8 is a view explaining a sixth embodiment.
Figure 9:
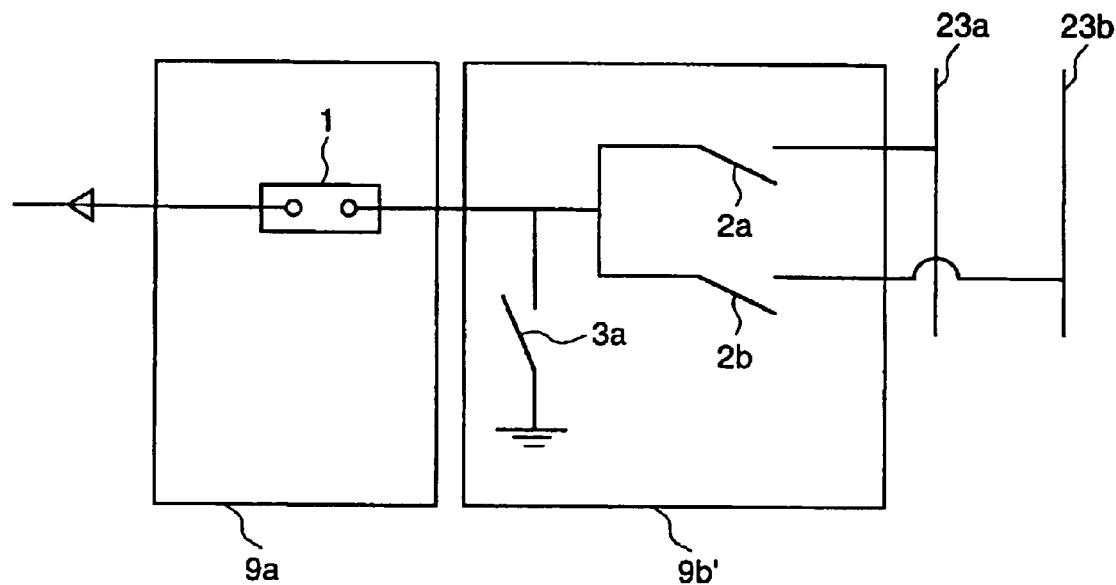
FIG. 9 is a view explaining the sixth embodiment.

FIG. 8 and FIG. 9 are a view explaining a sixth embodiment of the present invention in which the disconnector in the load side is eliminated, and the example of the gas insulated switchgear is applied to a double bus line. In this example, the aforementioned breaker 1 also serves as a disconnector in the load side.

In most cases except the case of the bus line of the 1-½ breaking system, when maintenance and inspection of the breaker is required, the circuits connected to the aforementioned breaker can not transmit electric power. Therefore, the earthing switches 3a, 3b can be closed by opening the disconnectors 2a, 2b, and accordingly maintenance and inspection of the breaker 1 can be performed without shutting down the bus lines 23a, 23b though the disconnector in the load side is eliminated, as shown in FIG. 8 and FIG. 9.

Therefore, it is possible to make the whole gas insulated switchgear compact and to improve the cost performance. FIG. 9 shows an example in which the earthing switch 3b in the load side is further eliminated. In this case, number of earthing switches in the whole gas insulated switchgear can be reduced by arranging an in-air earthing switch at one side of the power transmission line in the load side.

Figure 10:
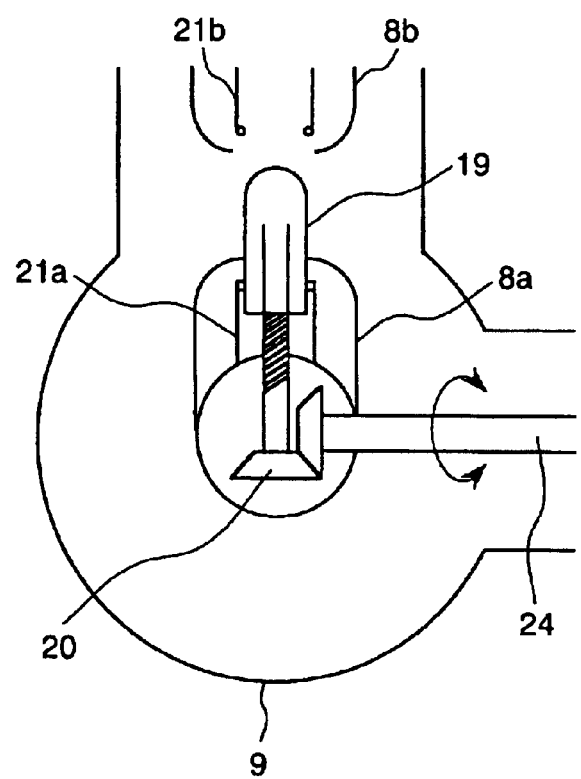
FIG. 10 is a view showing the details of a disconnector used in the gas insulated switchgear in accordance with the present invention.

FIG. 10 is a view showing the details of the disconnector used in the gas insulated switchgear in accordance with the present invention. In the figure, the reference characters 8a, 8b are shields in a movable contact electrode side and a fixed contact electrode side, respectively, and the reference character 9 is a metallic case, and the reference character 20 is a gear for converting the driving direction, and the reference characters 21a, 21b are the contact electrodes. As an operating rod 24 is driven to be rotated, the rotation force of the operating rod is converted to a driving force to drive the movable contact electrode 19 in the vertical direction through the gear 20. The structure is that the electric conduction performance is satisfied by bringing the movable contact electrode 19 in contact with the contact electrode 21b, and the insulation performance is satisfied by the shields 8a, 8b. In this disconnector, it is not necessary to arrange the operating rod 24 on the extension of the axis of the disconnector, which is different from a conventional disconnector of a linear driving type using a link.

Figure 11:
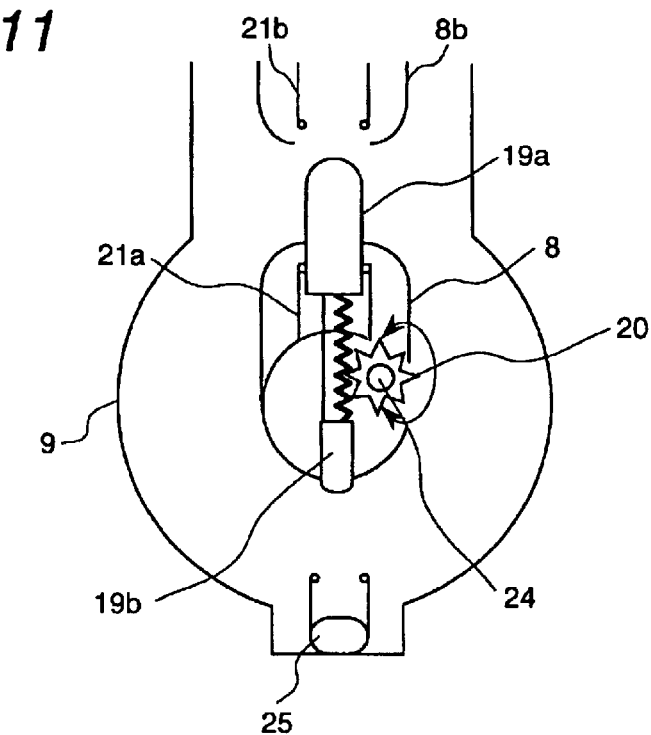
FIG. 11 is a view showing the details of another disconnector used in the gas insulated switchgear in accordance with the present invention.

FIG. 11 is a view showing the details of another disconnector used in the gas insulated switchgear in accordance with the present invention. Referring to the figure, the reference character 19a is a movable contact electrode in the disconnector side, and the reference character 19b is a movable contact electrode in the earthing switch side, and the reference character 25 is a grounding side contact electrode of the earthing switch.

Because this switch is a complex switch (DS/ES) which has functions of a disconnector and an earthing switch, one of the functions can be opened when the other is closed. Therefore, part of a mechanical interlock can be simplified. Further, since in the switch the movable contact electrode 19b of the earthing switch and the movable contact electrode 19a of the disconnector are arranged on a single axis, the disconnector and the earthing switch can be driven at a time by driving an operating rod 24. Therefore, number of operating devices can be reduced.

Figure 12:
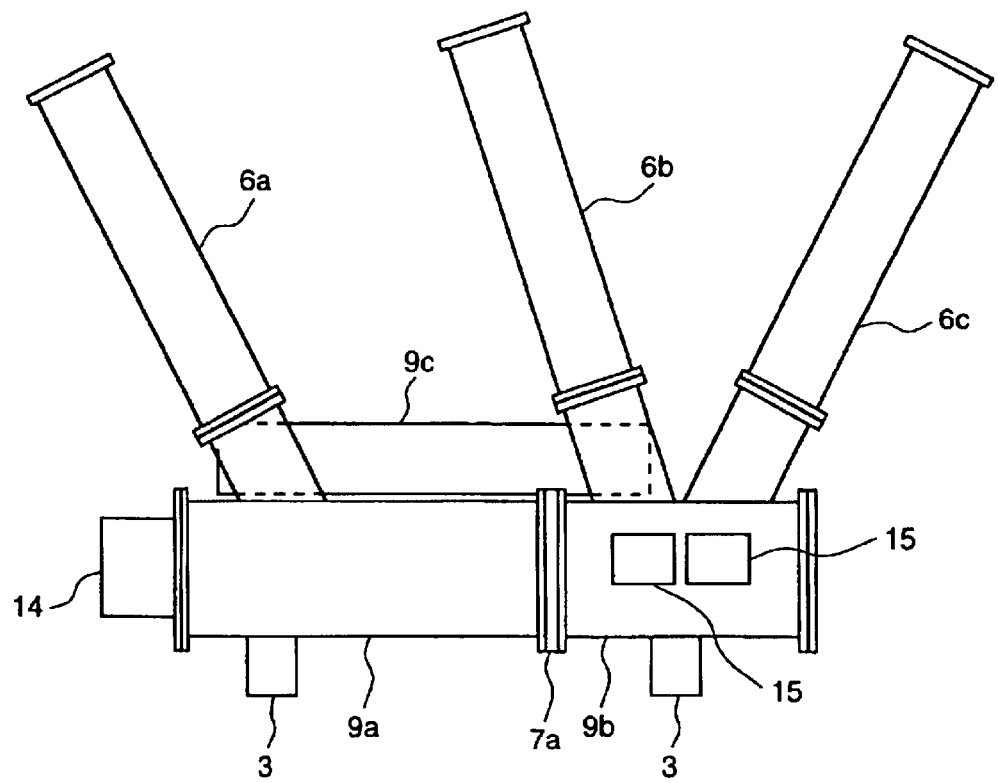
FIG. 12 is a view explaining a seventh embodiment.
Figure 13:
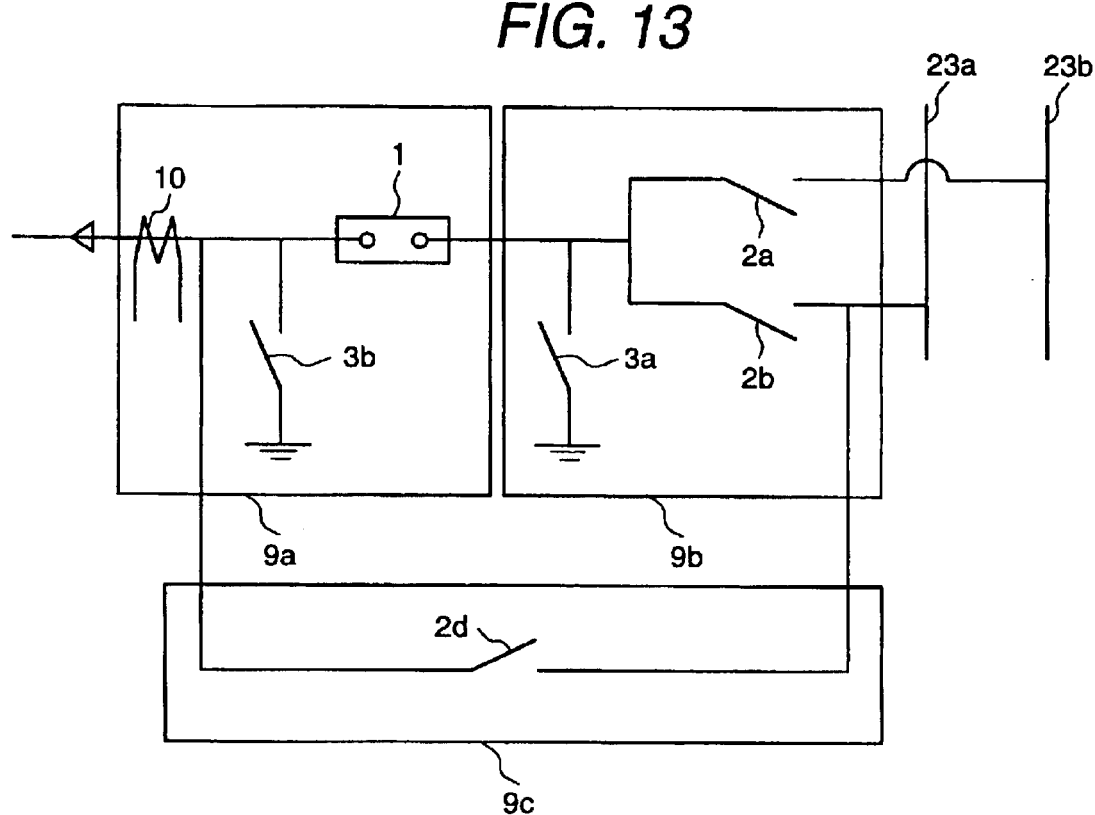
FIG. 13 is a view explaining the seventh embodiment.

FIG. 12 and FIG. 13 are a view explaining a seventh embodiment of the present invention. FIG. 12 is the view showing a gas insulated switchgear having a bypass disconnector, and FIG. 13 is the view showing an example in which the switchgear is applied to a double bus line. Referring to the figure, the reference character 9c is a metallic case containing a bypass disconnector 2d, and the metallic case 9c is arranged nearly in parallel to the metallic case 9a containing the breaker 1 and the metallic case 9b containing the disconnector. Further, by attaching a current transformer 10 outside an electric path formed by the bypass disconnector, transmitting current can be measured by the current transformer 10 while the bypass circuit is being used.

Figure 14:
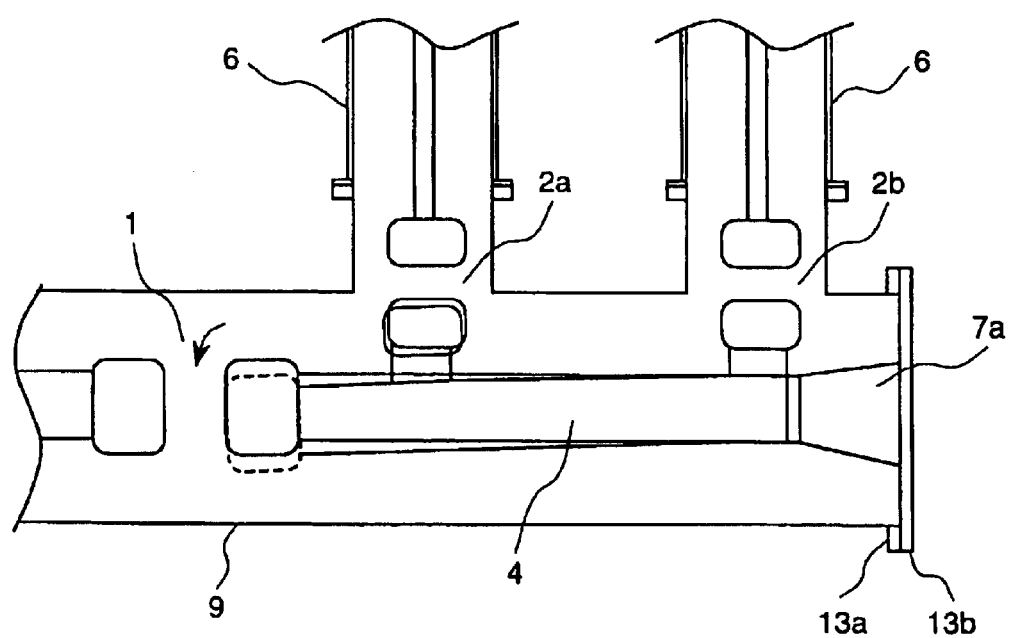
FIG. 14 is a view explaining another operation effect.
Figure 15:
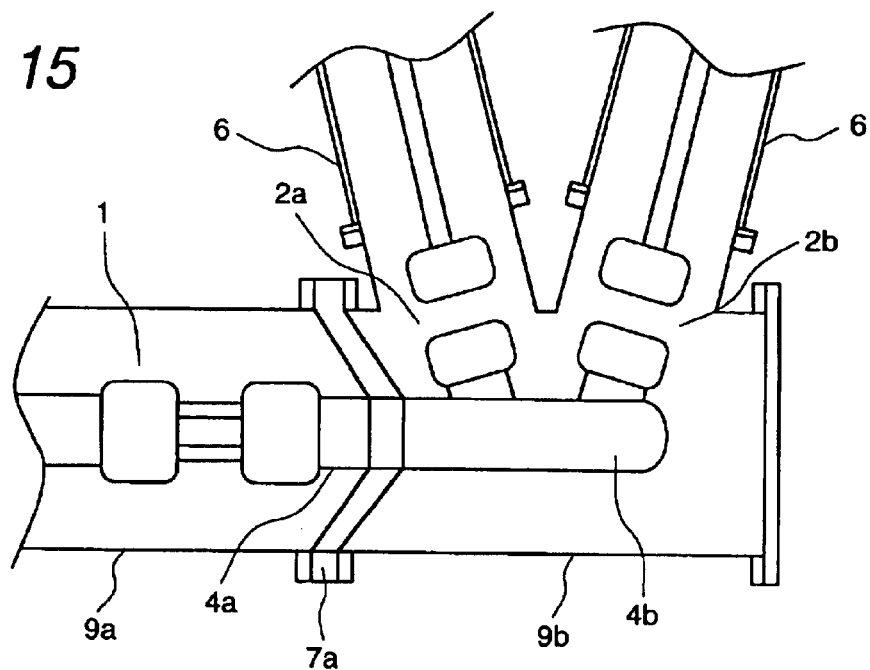
FIG. 15 is a view explaining another operation effect.

FIG. 14 and FIG. 15 are views explaining another operation effect of the present invention. FIG. 14 is the view showing the gas insulated switchgear containing a breaker 1 and insulators 2a, 2b in a single metallic case, and FIG. 15 is a view showing the gas insulated switchgear separately containing a breaker 1 and insulators 2a, 2b in individual metallic cases.

That is, in the case where the breaker 1 and the insulators 2a, 2b are contained in the single metallic case as shown in FIG. 14, if a breaker not having any insulation support having a high insulation reliability between electrodes is employed, an internal conductor 4 attached to the metallic case through flanges 13a, 13b will be deflected to cause axis dislocation in the breaker 1 and the insulators 2a, 2b. On the other hand, in the case where the breaker and the insulators are separately contained in the individual metallic cases, a gas partition spacer 7a may be arranged between the breaker 1 and the insulators 2a, 2b, as shown in FIG. 15. Since the gas partition spacer 7a also serves as a support for the internal conductors 4a, 4b to shorten the support length of the internal conductors 4a, 4b, the mechanical strength of the internal conductors themselves are easily increased. Further, since axis adjustments of the breaker 1 and the disconnectors 2a, 2b may be separately performed, the axis adjustments at assembling can be easily performed.

Other embodiments in accordance with the present invention will be described below.

Figure 16:
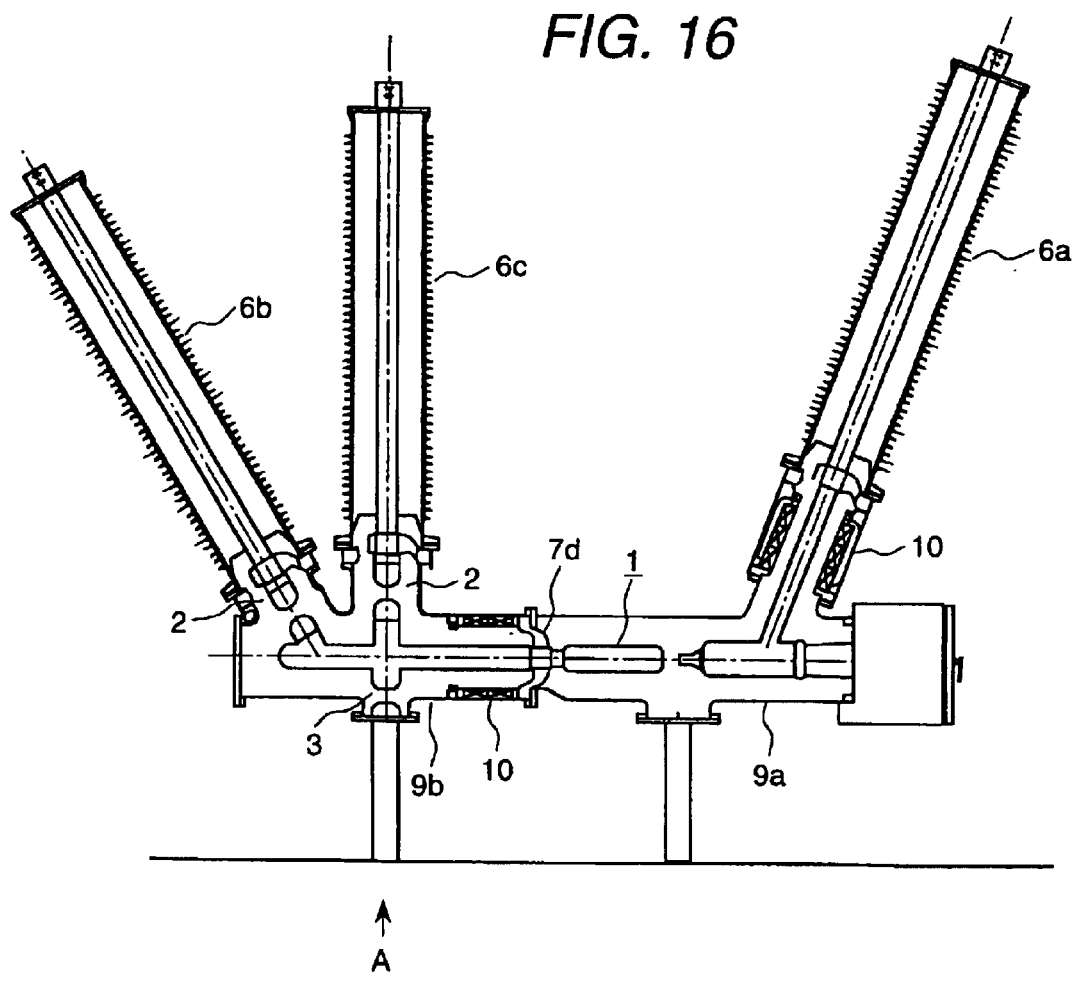
FIG. 16 is a view showing another embodiment in accordance with the present invention.
Figure 17:
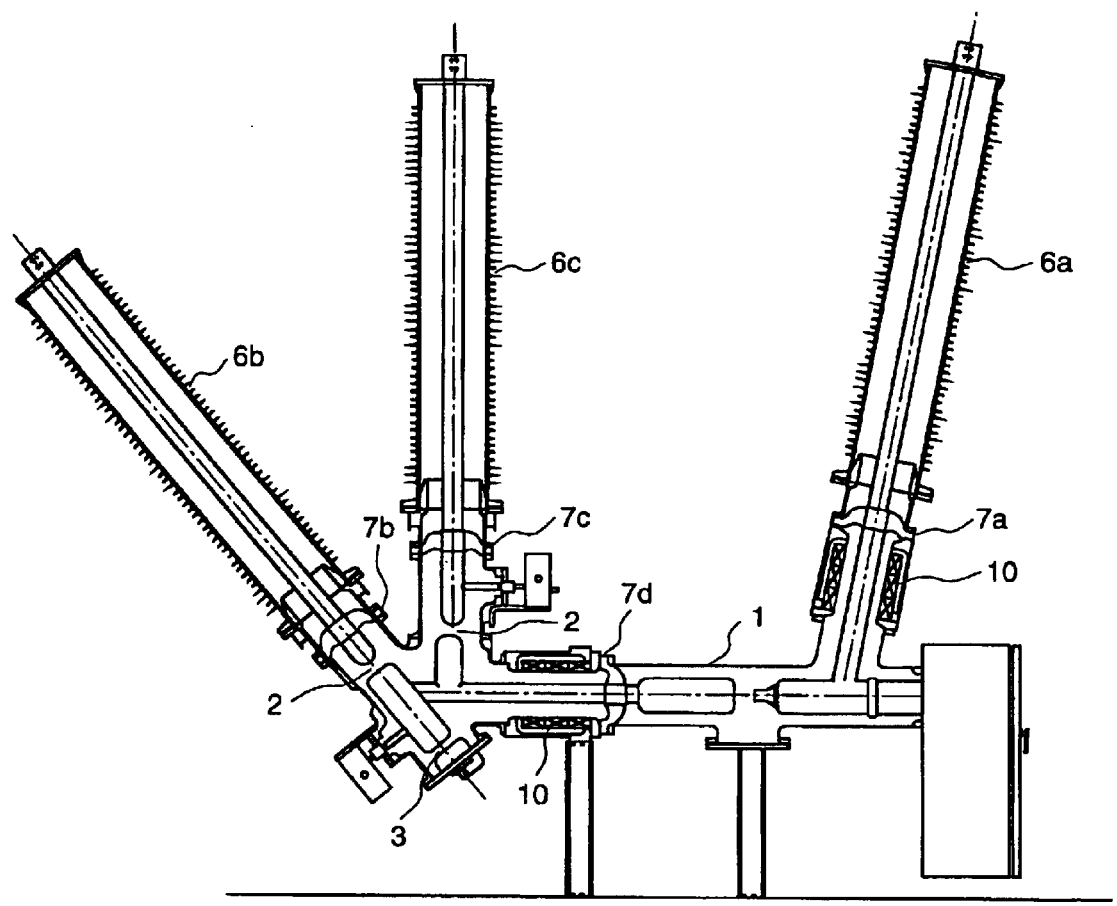
FIG. 17 is a view showing another embodiment in accordance with the present invention.

FIG. 16 and FIG. 17 are detailed views explaining the structure of a current transformers and showing embodiments to which a 3-position disconnector is applied, and therein parts in the figures identified by the same reference characters are basically the same parts as the parts described above. FIG. 16 shows an example in which current transformers 10 are arranged in both ends of the breaker 1, and one current transformer 10 between the two current transformer is contained inside the bus-line disconnector tank. Therein, the PD and the arrestor is not shown in the figures. By containing the current transformer in the case 9b containing the bus line side disconnector 2, the machine can be constructed by reducing number of tanks. Accordingly, the assembling becomes easy, and the switchgear can be made compact.

Further, by arranging a 3-position disconnector, to be described later, in the breaker 1 side for the disconnector 2 under the bushing for leading a bus line 6c, number of the whole used operating units can be reduced. Furthermore, in a case where the present embodiment is applied to a bus line of the single bus line breaking system or the 1-½ bus line breaking system, the present embodiment can be used by eliminating only the disconnector 2 and the bushing 6b in left-hand side in the figure. Therefore, commonality of the components can be performed to improve the cost performance. According to the embodiment, since the current transformers 10 are arranged in the both ends of the breaker, it is possible to judge whether a position of a ground fault occurrence is inside or outside the breaker even if the ground fault occurs. In addition, as anther example of current transforming method, either of the transformers may be eliminated because the reliability of the breaker is very high. Therefore, the example of the current transforming method can make the switch gear further compact. Although the example of using a the current transformers 10 of a winding type is shown in this embodiment, the switchgear can be made further more compact by using Rogosky's coils instead of the winding type coils. Further, if perforated spacers 7 are employed for the spacers arranged the bottom portions of the bushings 6a, 6b, 6c, as in the present embodiment, the bus line disconnectors and the bus line bushings are contained in a single gas compartment to reduce number of gas compartments. Therefore, there are effects in that provision of gas exhausting members for the bushings is not necessary, and that the structure of the tank and the structure of the components can be made simple, and that the assembling efficiency can be improved, and that erroneous operation of the gas charging and evacuation can be prevented.

FIG. 17 shows an embodiment in which the gas compartments of the bus line side disconnector are formed by a plurality of tanks, which is different from the switchgear of FIG. 16. Similarly to the embodiment of FIG. 16, the embodiment of FIG. 17 has the structure that the current transformers 10 are arranged in both sides of the breaker 1, and the PD and the arrestor is not shown in the figures. In the present embodiment, a 3-position disconnector, to be described later, is arranged in the bottom portion of the bushing 6b in the left-hand side end in the figure. The bus line disconnectors 2 are partitioned from the breaker 1 using a gas partition spacer 7d, and the bus line disconnectors 2, the earthing switch 3 and the current transformer 10 are contained in the case 9b as a single gas compartment, and gas compartments for the bushings 6a, 6b and 6c are formed by the spacers 7a, 7b and 7c, respectively. By employing such a structure, the volume of the tank can be decreased since the portion of the earthing switch 3 is also used as a particle trap. Although the example of using a the current transformers 10 of a winding type is shown in this embodiment, the switchgear can be made further compact by using Rogosky's coils instead of the winding type coils.

Figure 18:
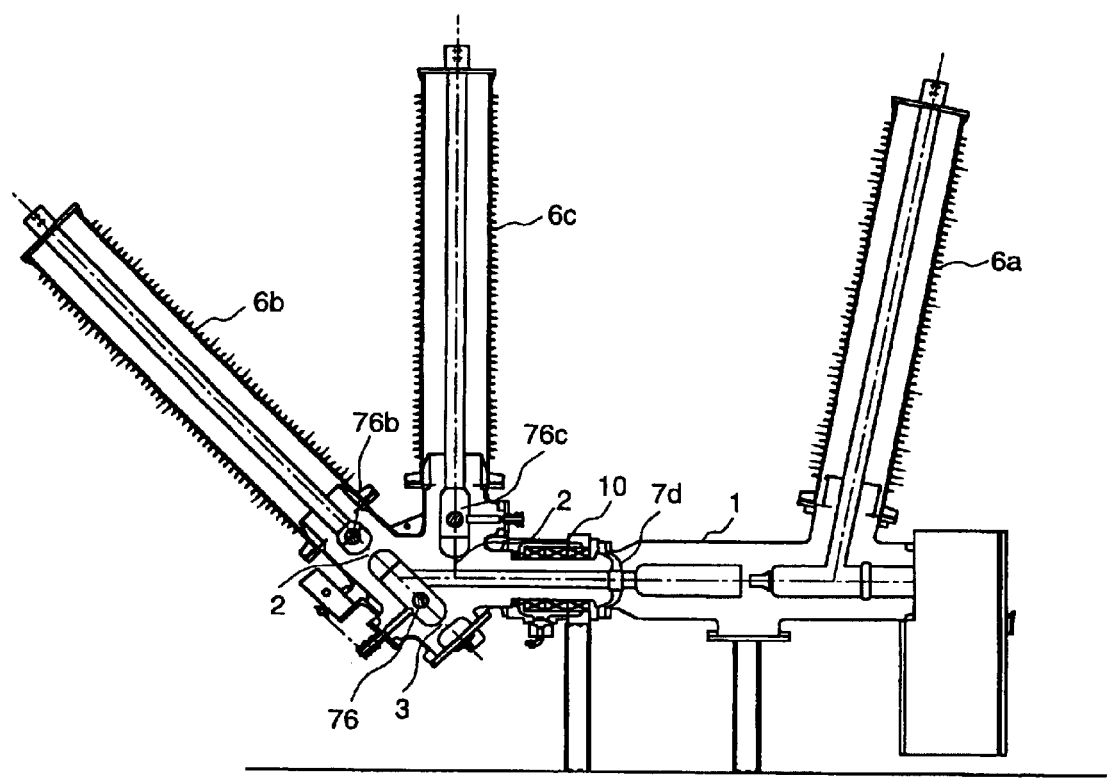
FIG. 18 is a view showing another embodiment in accordance with the present invention.

FIG. 18 shows an embodiment in which the tanks forming the gas compartments of the bus line side disconnectors 2 in FIG. 17 are integrated to one tank. Similarly to the embodiment of FIG. 17, the PD and the arrestor is not shown in the figures. Since number of flanges is reduced by reducing number of tanks, the reliability of gas sealing can be improved, and the assembling workability can be also improved. Further, the present embodiment shows an example in which post spacers are employed for supporting the bus line side disconnectors 2, and the cross sections of the post spacers 76 are illustrated by hatching lines. Since the bushings and the disconnectors are contained in the single gas compartment by employing the post spaces 76, it is possible the gas pips and the gas filling and evacuating members can be simplified. Although there is a disadvantage in that the grounding inside the breaker can not be detected in the present embodiment because the current transformer 10 is arranged only one side end of the breaker, the switchgear can be made compact and the cost performance can be improved. Further, the current transformers 10 may be arranged in the both side ends of the breaker 1, similarly to the embodiments of FIG. 16 and FIG. 17.

Furthermore, in the above-mentioned embodiment in which the current transformers 10 are arranged in the both side ends of the breaker 1, the accuracies of the current transformers in the both side ends of the breaker may be made different from each other. For example, by arranging a winding type current transformer having a higher accuracy in one side and a Rogosky's coil type current transformer having a lower accuracy in the opposite side, the winding type current transformer having a higher accuracy is used for measuring electric power, and the Rogosky's coil type current transformer is used for detecting internal grounding of the breaker. By doing so, the switchgear comprises the capability of detecting grounding inside the breaker, the performance comparative to the GIS and the cost performance at a time.

Further, as a modification of the above-mentioned embodiment, in a case where three gas insulation switchgears for one phase are arrayed to form a gas insulation switchgear for three phases, it is possible to operate the disconnectors or the earthing switches at the same positions by an operating machine for three phases together at a time using chains in operation of the disconnectors or the earthing switches. By doing so, difference in operation of the disconnectors or the earthing switches among phases can be suppressed, and number of operating machines can be reduced as a whole.

Figure 19:
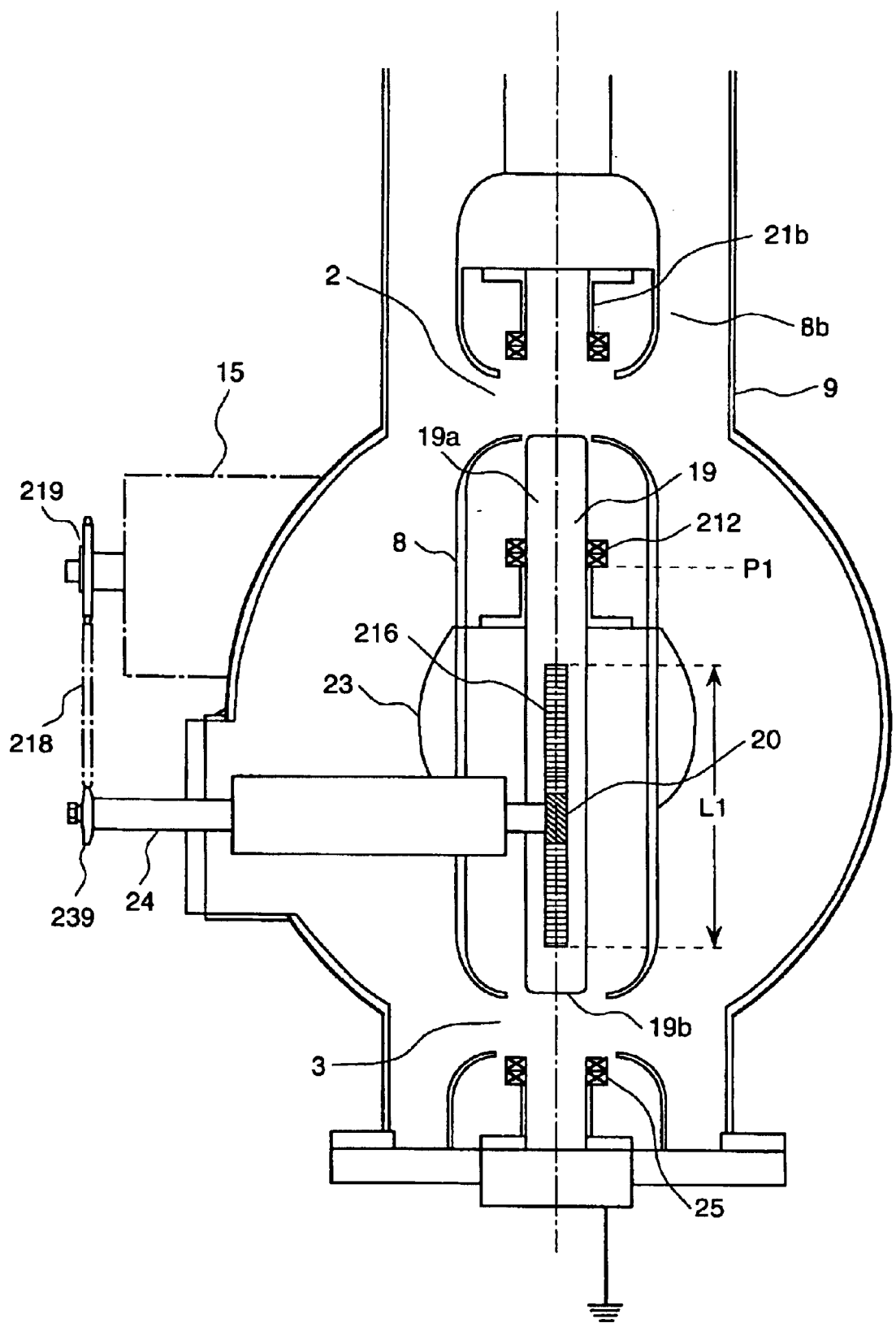
FIG. 19 is a view showing the structure of a 3-position disconnector used in the present invention.

FIG. 19 is a view showing the detailed structure of the 3-position disconnector seeing from the cross-sectional plane A of the gas insulation switchgear of FIG. 16.

The 3-position disconnector employs a driving method that a power transmission mechanism from the operating machine 15 constructed of a motor 219 to an operating rod 24 for operating the disconnector 2 and the earthing switch 3 made of an insulator is driven by a chain 218.

In these figures, the earthing switch 3 and the disconnectors 2 are contained inside the metallic case 9 of the gas insulation switchgear. The disconnector 2 comprises a contact electrode 21b, and the earthing switch 3 comprises a grounding side contact electrode 25. The disconnector forms three positions of on, off and grounding positions by movement of a movable electrode 19. The movable electrode 19 is a member capable of electrical contact with the contact electrode 21b and the grounding side contact electrode 25. Further, the movable electrode 19 has a pinion gear 20 which is engaged with a rack gear 216 to transmit a driving force. The rod 24 is joined to the gear 20 to transmit the driving force from the external. The rod 24 is connected to the operating machine 15 through the chain 218 as the power transmission mechanism.

As the insulation gas filled in the metallic case 9 used are $SF_6$ or the other insulation gas, for example, a mixed gas of $SF_6$ and one or more kinds selected from the group consisting of $N_2$, $CO_2$, CF4, $O_2$ and dry air. Further, the metallic case 9 in a vacuum state inside may be used depending on a condition of use.

Operation of the 3-position disconnector will be described below in detail.

The movable electrode 19 is arranged in a conductor 23, the contact electrode 21b for the disconnector 2 and the grounding side contact electrode 25 for the earthing switch 3 are arranged so as to be opposite to both ends of the movable electrode 19. Therein, the grounding side contact electrode 25 is grounded. The rack gear 216 is arranged on the movable electrode 19, and the contact electrode 21b, the grounding side contact electrode 25 and the rack gear 216 are axially arranged on a straight line. Electrically conductive extraneous objects produced at engaging of the gear 20 with the rack gear 216 and at moving of the movable electrode 19 are enclosed in a shield 8 so as to prevent from entering into the high voltage field space.

The rack gear 216 having a length L1 is arranged on the movable electrode 19 as a driving force receiving member, and even when the gear 20 as the driving force transmission member is rotated to bring the movable electrode 19 in contact with the contact electrode 21b or with the grounding side contact electrode 25, the rack gear 216 having the length L1 is formed so as to be not contact with the movable contact portion 212 which electrically connects the movable electrode 19 with the conductor 23. That is, by arranging the movable contact portion 212 at a position (position P1) distant from the gear 20 as the reference position above the length L1 which is the maximum length that the rack gear 216 as the driving force receiving member can move, it is possible to prevent the extraneous objects produced in the rack gear 216 and the gear 20 from attaching to the movable contact portion 212. By doing so, since the extraneous objects are not attached to the movable contact portion 212, the extraneous objects produced in the rack gear 216 and the gear 20 are not propagated to portions other than the movable electrode 19 even when the movable electrode 19 is driven. Further, it is possible to prevent the extraneous objects produced by sliding of the movable electrode 19 and the movable contact portion 212 on each other from being propagated by the rack gear 216 and the gear 20 to enter the high voltage electric field space.

In the present embodiment, the arrangement of the movable contact portion 212 is designed in such structures that the gear 20 arranged in the movable electrode 19 may be in contact with the movable contact portion 212 to produce electric conductive extraneous objects, and that the one movable contact portion 212 serves as the movable contact portions for both of the disconnector 2 and the earthing switch 3.

The driving mechanism of the movable electrode 19 will be described below.

The operating rod 24 is arranged in a direction normal to a plane on which the conductor 23 and the disconnector 3 and the earthing switch 3 are arranged. One end of the operating rod 24 is extended outside the metallic case 9, and a rotating seal is arranged between the operating rod 24 and the metallic case 9 to prevent the gas from leaking and to reduce the rotation friction. A sprocket 239 is attached to the end portion of the operating rod 24 outside the tank. The pinion gear 216 is attached to the other end of the operating rod 24 through an insulator, and converts the rotating motion of the operating rod 24 to the linear motion by the rack-pinion mechanism to operate the movable electrode 19.

Although the structure of the 3-position disconnector of FIG. 19 has been described by taking as an example, ther is no need to say that the structure can be applied to the 3-position disconnectors described in FIG. 17 and FIG. 18.

Since in the gas insulated switchgear in accordance with the present invention, all the breakers and switches necessary for a high voltage switchgear unit such as the beaker, disconnectors and earthing switches are about two kinds of metallic cases, the switchgear can be made compact. In addition, there is an advantage in that maintenance and inspection can be performed without shutting down the bus line. Therefore, because the switchgear can be replaced for an existing switchgear and because maintenance and inspection can be performed without shutting down the bus line, it is possible to provide a switchgear capable of supplying high quality electric power to users. Further, since the switchgear can be formed compact as described above, a yard for a switching station or the like can be effectively used. Furthermore, since the switchgear in a completely assembled state can be shipped because of compactness of the whole switchgear, site work is only connecting work for the bus lines and the load lead wires and installing and connecting work for the relay-related equipment to substantially reduced the amount of site work.

As described above, according to the present invention, it is possible to provide the gas insulated switchgear which can make the whole switchgear compact and can perform maintenance and inspection of the breaker without shutting down the bus line.

What is claimed is:

1. A gas insulated switchgear including bus lines, a plurality of bus line disconnectors and a breaker, comprising:

a first case containing said breaker, said first case being earthed;

a second case containing said plurality of bus line disconnectors, or a plurality of second cases containing said plurality of bus line disconnectors in a single gas compartment, wherein
said first metallic case and said second metallic case are connected to each other through a gas partition spacer; and which further comprises a bypass disconnector for bypassing between a leading point of a bushing for leading a load and one of said bus lines; and a current detector for measuring a center conductor current of said bushing.

2. A gas insulation switchgear according to claim 1, wherein a winding current type transformer is arranged in one side of said breaker, and a Rogoaky's coil type current transformer is arranged in the other side.

3. A gas insulation switchgear according to claim 1, which further comprises two bushings for a double bus line, disconnectors being arranged between said two bushings and said breaker, and wherein a 3-position disconnector is used as the disconnector nearer to said breaker.

* * * * *